United States Patent
Ochoa et al.

(10) Patent No.: US 7,677,292 B1
(45) Date of Patent: Mar. 16, 2010

(54) HAND-HELD/PORTABLE TIRE DEMOUNTING MACHINE

(76) Inventors: Justin Ochoa, 505 24th St., Alamogordo, NM (US) 88310; Sandy Ochoa, 505 24th St., Alamogordo, NM (US) 88310

( * ) Notice: Subject to any disclaimer, the term of this patent is extended or adjusted under 35 U.S.C. 154(b) by 0 days.

(21) Appl. No.: 12/328,976

(22) Filed: Dec. 5, 2008

(51) Int. Cl.
*B60C 25/01* (2006.01)
(52) U.S. Cl. .................. 157/1.3; 157/1.17
(58) Field of Classification Search ............ 157/1.3, 157/1.17, 11
See application file for complete search history.

(56) References Cited

U.S. PATENT DOCUMENTS

| | | | | |
|---|---|---|---|---|
| 1,059,128 A * | 4/1913 | Edwards | ............... | 157/1.17 |
| 1,475,519 A * | 11/1923 | Snider | ............... | 157/1.17 |
| 1,519,558 A * | 12/1924 | Snider | ............... | 157/1.17 |
| 1,806,947 A * | 5/1931 | Mjelva | ............... | 157/1.17 |
| 2,367,638 A * | 1/1945 | McCulloch | ............... | 157/1.17 |
| 2,575,330 A * | 11/1951 | Carlson | ............... | 157/1.17 |
| 2,684,710 A * | 7/1954 | Calvin | ............... | 157/1.17 |
| 2,701,010 A * | 2/1955 | Schafer | ............... | 157/1.17 |
| 4,462,451 A * | 7/1984 | Ogren | ............... | 157/1.17 |
| 4,524,813 A * | 6/1985 | Gering | ............... | 157/1.17 |
| 4,589,462 A * | 5/1986 | Giles | ............... | 157/1.17 |
| 4,646,806 A * | 3/1987 | Richardson | ............... | 157/1.17 |
| 4,800,943 A * | 1/1989 | Umemoto et al. | ............... | 157/1.17 |
| 4,890,661 A * | 1/1990 | Goebel | ............... | 157/1.3 |
| 4,913,770 A * | 4/1990 | Sims | ............... | 157/1.17 |
| 4,953,606 A * | 9/1990 | Brown, Jr. | ............... | 157/1.17 |
| 5,191,934 A * | 3/1993 | Wicklund | ............... | 157/1.17 |
| 5,421,392 A * | 6/1995 | Unrau | ............... | 157/1.17 |
| 6,564,848 B1 * | 5/2003 | Brahler et al. | ............... | 157/1.17 |
| 7,124,800 B2 * | 10/2006 | Tran | ............... | 157/1.17 |
| 7,350,554 B1 * | 4/2008 | Okrepkie et al. | ............... | 157/1.17 |

* cited by examiner

*Primary Examiner*—David B Thomas
(74) *Attorney, Agent, or Firm*—Dennis F. Armijo

(57) ABSTRACT

A tool for pulling a first and second tire bead off of a wheel assembly. The tool is inserted between the bead to be removed and the rim edge, and engages the bead to be removed with a grappling structure and pulls the bead over the rim edge by a linear drive assembly disposed inside a tubular structure affixed to the grappling structure. Simultaneously an angled stay is positioned on the rim which is pressed in an opposite direction of the pulling motion. A second embodiment pulls the rim from a second bead of a tire. A hook is inserted between the rim edge and the second tire bead and hooks onto the lower rim edge. A linear drive assembly provides a pulling motion to pull the rim over the second bead, while a push plate simultaneously pushes the tire side wall in an opposite direction from the pulling motion.

10 Claims, 9 Drawing Sheets

HAND-HELD/PORTABLE TIRE DEMOUNTING MACHINE

REFERENCE TO CO-PENDING APPLICATIONS FOR PATENT

The present Application for Patent is related to the following co-pending U.S. Patent Applications:
U.S. patent application Ser. No. 12/203,296 entitled "Portable Tire Demounting Tool" and U.S. patent application Ser. No. 12/323,254 entitled "Portable Tire Demounting Tool", the teachings of which are incorporated herein by reference.

BACKGROUND

1. Field of the Invention (Technical Field)

The claimed invention relates to tools and more particularly to tools for demounting tires from wheel assemblies.

2. Background Art

There is a large variety of hand operated and power assisted tire demounting tools on the market. They range from simple pry bars to geometrically complex leveraging devices, along with power operated demounting devices. With the wide range of composite materials, sizes, bead shapes, and methods of manufacture for tire and wheel assemblies, there are a number of inherent limitations to the current methods and apparatuses for tire demounting. These limitations range from functionality to adaptability. They fail to address some key factors in the successful removal of a tire from the rim or wheel assembly.

The functionally of the prior art systems for demounting tires is limited in a number of ways. Many conventional pry spoons and bars are made with a narrow design in relationship to the tire bead. This results in damage and tearing of the tire bead while trying to remove the tire from the wheel. The construction of low profile tires also is a limiting factor for many of the current tools. These low profile sidewalls and the use of multi-ply steel or fiber construction, make these tires stiff and difficult to work with. Current power operated devices, which typically work in a concentric motion, tend to tear and ruin the bead of these types of tires. Hand tools often prove ineffective, having neither the shape to conform to such tires or sufficient prying force to extract them from the rim or wheel. Removal of these tires with the current devices results in damaging the tire beyond repair thus, defeating the purpose of repairing and remounting the tire.

A further limiting factor for many of the current tools is the removal of soft side wall tires with a highly pliable bead. These tires present the problem of having a bead that stretches, but becomes difficult to extract from the wheel. The highly pliable bead will typically be pried above the rim only in the area directly engaged by the tool or pry bar. Disengaging the tool from this area will cause the elasticity of the bead to return to its original position, thus failing to remove the tire from the rim. The narrow hand operated spoons and pry bars are especially susceptible to this malfunction and there is often the added consequence of bead tearing.

Another limiting factor for many of the prior art methods is a failure to address the demounting of what are referred to in the industry as "super single" sized tires. These are extra wide wheel assemblies with their corresponding extra wide tires. Being extra wide in their construction, these type of tire and wheel assemblies pose a problem for the current methods of demounting, often rendering most of these methods completely ineffective, because they cannot accommodate this size of tire. The current methods available to accommodate these types of tires are exclusive solutions made for the specific purpose of removing these tires from their wheel assemblies and therefore not multi-functional.

Finally, these prior art methods, whether power or hand operated tire demounting systems, work on one of two principles which further limit their effectiveness in removing a variety of tires from a variety of rims. The power operated tools almost exclusively work on the principle of concentric motion having a demounting armature that is engaged between the dm and bead and is then rotated around a central axis three hundred and sixty degrees (360°) or until the tire bead is dislodged from the rim by the demounting device. This concentric motion causes severe stretching and even tearing of the bead because this method does not work in accordance with the construction of tire and wheel assemblies as a whole. These power operated tools also fail to address the range and variety or tire and wheel assemblies because they are limited to fixed sizes. The hand operated tools work exclusively with a leverage of motion principle. This basic principle of the hand operated tools limits their range of motion by the leveraging stroke, rendering this method inadequate for the extraction of a tire from the rim. Further, some wheel assemblies have "a reverse wheel", which have the main part of the hub center offset to the top of the demounting side. The placement of the hub center further limits the leveraging stroke of the current hand operated pry bar tools to such a degree that they are ineffective. The hand operated tools of complex geometry are further limited in the variety of tire and wheel assemblies they will work on, often being constructed for exclusive sizes and shapes of tire and wheel.

SUMMARY

Aspects disclosed herein address the above stated needs by the provision of apparatuses, methods, and systems for demounting a plurality of different types of tires from a plurality of rims without causing damage to the tire bead.

Disclosed are hand-held, mechanically operated, portable, demounting tools for removing tires from wheel assemblies. These tools work on the principle of a combination motion. The combination motion includes an element of retraction and an element of forward motion, working in concert to accomplish the common goal of removing the tire from the wheel assembly. This is accomplished by at least one stationary element, along with its related components. The stationary element receives at least one, but is not limited to, a single linear motion assembly along with its related components.

In a first embodiment, the tire bead is pulled over the rim or wheel assembly. The stationary element is comprised of a number of related components, including a hollow, elongated tube which acts as a receptacle for a drive assembly. The elongated tube also acts as a receptacle for a ram/retractable motion structure for creating a telescoping unit. The drive mechanism for providing the telescoping function is described fully in co-pending patent applications, U.S. patent application Ser. No. 12/203,296 entitled "Portable Tire Demounting Tool" and U.S. patent application Ser. No. 12/323,254 entitled "Portable Tire Demounting Tool". The disclosures from the co-pending patent applications are incorporated as if fully set forth herein. The elongated tube also provides a place for the operator of the device to position his hands on the tool during the process of tire removal from the wheel assembly. The elongated tube also provides a place to affix an extension element for grappling the bead of the tire.

The extension element is preferably made of material having a width of sufficient strength and thickness, and of sufficient narrowness to be placed between the bead of the tire and the wheel assembly. Further, the extension element runs parallel to the elongated tube and extends from the elongated tube at its bottom end. The extension element is offset to one side of the elongated tube to engage the tire bead as discussed below. The extension element can be affixed either permanently or interchangeably to the elongated tube. Affixed at the distal end of the extension element is a grappling structure comprising a width substantial enough to engage a significant portion of the tire bead along its edge, a length narrow enough to be placed between the tire bead and the rim flange of the wheel assembly, and a height sizeable enough to remain stiff as force and pressure is placed upon it during tire removal from the wheel assembly. The grappling structure preferably is configured to have a radius curve running along its width that is approximately the radius of the rim flange of the wheel assembly. The bottom side of this grappling structure is substantially flat and may have a roughened surface such as cross hatched impressions to further grip and engage the bead of the tire. The bottom side of this grappling structure preferably has a V-shape or U-shape for easy insertion between the rim flange of the wheel assembly and the tire bead.

Finally a drive assembly is inserted and housed inside the top portion of the elongated tube to provide a driving motion for the telescoping function. The drive assembly can be a threaded bolt with a washer, a bushing, and a second bushing/retainer. The entire drive assembly is disposed inside the elongated tube. Once in place, the entire assembly remains fixed in place, but allows the drive bolt of the drive assembly to spin freely. The drive bolt of the drive assembly may be actuated by a manually operated handle, an outside pneumatic air gun, air motor, or by an integrated unit of this same design. Alternatively the drive assembly may be a pneumatic, electric, or hydraulic assembly.

The telescoping motion is preferably provided by a linear motion assembly comprised of a number of related components. Ram member is preferably a hollow elongated tubular structure having a drive nut on top. This engages the drive bolt assembly. At the distal end of the ram member, is an angled stay to interface with the rim of the wheel assembly during the demounting procedure. The stay further provides a stationary push point that works in conjunction with the extension and grappling structure of the stationary assembly to remove the tire from the wheel assembly. The stay also serves as an arcing pivot point by which the tire bead can be removed in a smooth retractable pivot stroke that is natural to the construction of tire and wheel assemblies. The stay can be affixed permanently or interchangeably to the ram member. It may further be made of a non-abrasive, non-marring material such as hard plastic to prevent damage to the wheel assembly.

The preferred method for using the assemblies described above to remove a tire from a wheel assembly is as follows. First, the ram member is retracted telescopically via the drive assembly into the elongated tube to provide for sufficient clearance of the grappling structure and the extension element to be inserted between the tire bead and the rim of the wheel assembly without interference. The drive assembly is engaged to protract the ram member thereby pushing the angled stay against the rim of the wheel assembly. Once the angled stay contacts the rim, it provides a stationary point to push from, as well as a point of pivot. During this process the ram member slides past the elongated tube and grappling structure in a parallel linear motion. The increasing force and linear motion, along with a natural, pivoting, arcing motion, is placed upon the bead of the tire by the grappling structure pulling the bead upward and over the rim of the wheel assembly. Simultaneously, the angled stay is pushing in the opposite direction with a downward arcing motion in relationship to the rim. This contradiction of motion effectively removes the tire from the rim in a smooth peeling action. Once the first bead is removed, these steps are repeated for the removal of the second bead. In the case of the second bead, the ram member may require a greater length of retraction to reach the second bead.

In the second embodiment the rim or wheel assembly is pulled from the tire. The tool achieves the goal of removing a wheel assembly from the tire with at least one, but not limited to a single stationary element, along with its related components. The stationary element receives at least one, but is not limited to, a single linear motion assembly. This embodiment works exclusively for the removal of the wheel assembly from the second bead of the tire.

The stationary element comprises an internally disposed linear motion assembly. The linear motion assembly is fully described in co-pending patent applications, U.S. patent application Ser. No. 12/203,296 entitled "Portable Tire Demounting Tool" and U.S. patent application Ser. No. 12/323,254 entitled "Portable Tire Demounting Tool". The disclosures from the co-pending patent applications are incorporated as if fully set forth herein. The stationary element comprises a hollow, elongated tube which acts as a receptacle for a drive assembly. The elongated tube also acts as a receptacle for a ram member which is moveable, creating a telescoping effect. The elongated tube further provides a place for the operator to position his hands on the tool during the process of tire removal from the wheel assembly. The elongated tube also provides a place to affix an extension element with a hook for engaging the rim of the wheel assembly.

The preferred extension element is constructed from a material with a width and thickness of sufficient strength and narrowness to be placed between the second bead of the tire and the wheel assembly. The extension element runs parallel to the elongated tube and extends from the bottom of the elongated tube. The extension element is preferably offset to one side of the elongated tube. The extension element can be affixed either permanently or interchangeably to the elongated tube. At the distal end of the extension element is a hook having a width substantial enough to withstand the force and pressure that is placed upon it during the demounting procedure, and narrow enough to easily be placed between the second bead of the tire and the wheel assembly. The hook is also of a shape and length sufficient enough to engage the wheel assembly effectively hooking onto the rim flange to facilitate a pulling motion, while remaining rigid and strong during the demounting procedure.

The drive assembly is inserted and housed inside the top portion of the elongated tube on the opposite end of a push plate. The drive assembly can be a threaded bolt with a washer, a bushing, and a second bushing/retainer. The entire drive assembly is disposed inside the elongated tube running parallel with its length. Once in place, the entire assembly remains fixed in place, but allows the drive bolt of the drive assembly to spin freely. The drive bolt of the drive assembly may be actuated by a manually operated handle, an outside pneumatic air gun, air motor, or by an integrated unit of this same design. Alternatively the drive assemblies may include pneumatic, electric, or hydraulic systems.

The linear motion assembly preferably comprises an elongated ram member. The ram member can comprise a hollow elongated tubular structure having a drive bolt on top. The drive bolt engages the drive assembly creating the telescoping effect. At the distal end of the elongated ram member, is a push plate comprising a wide, heel curved member meant to interface with the tire side wall near the second bead of the tire during the demounting procedure. The push plate provides a stationary push point that works in conjunction with the extension element and hook of the stationary element to remove the wheel assembly from the tire. The push plate also serves as an arcing pivot point by which the tire bead can be removed in a smooth retractable pivot stroke that is natural to the construction of the tire and wheel assemblies. The push plate can be affixed permanently or interchangeably to the ram member.

The method for removing a second bead of a tire from a rim or wheel assembly is described as follows. The elongated ram member is retracted via the drive assembly into the elongated tube. The elongated ram member and the push plate are retracted sufficiently for the clearance of the hook and the extension element to be inserted between the second tire bead and the rim of the wheel assembly without interference. Hook and extension elements are turned with the hook face running parallel to the rim of the wheel assembly, inserted into the space between the rim and second bead, and then the hook face is turned ninety degrees (90°) to engage or hook the rim of the wheel assembly. The tool is now in position to begin the demounting procedure. The drive assembly is engaged to protract the ram member to work in a ram mode of operation by pushing the push plate against the tire sidewall. Once the push plate contacts the tire sidewall it provides a stationary point to push from as well as a point of pivot for leveraged removal of the wheel assembly from the tire. During this process the ram member slides past the elongated tube and the hook in a parallel linear motion. This creates an increasing force upon the wheel assembly by the hook pulling it upward and free of the second tire bead while simultaneously pushing the tire side wall via the push plate in the opposite direction. This contradiction of motion effectively removes the wheel assembly from the tire in a smooth peeling action. If the linear motion is insufficient in removing the wheel assembly from the second tire bead then a leveraging motion may be used by pulling the entire apparatus away from the center of the wheel. This effectively leverages the heel portion of the tire grappling structure against the side wall of the tire. By these methods the wheel assembly is removed from the second bead of the tire.

The presently claimed invention provides novel and advanced methods for demounting tires from wheel assemblies and/or wheel assemblies from tires with a portable/hand-held, mechanically operated tool. This system demounts a wide range and variety of tires and their wheel assemblies with a minimum of effort while limiting any damage to the wheel or tire. The system can be used to demount tires from reverse wheels, low profile and multi-ply, and/or stiff side wall tires, extra wide tire and wheel assemblies, such as "super singles".

Yet another object of the presently claimed invention is to provide a hand-held, mechanically operated tool or tools which will demount the tire and their wheel assemblies with a substantially linear motion in conjunction with a pivoting motion, said pivoting motion running substantially perpendicular to the axis of the tire and wheel assembly. These motions working in unison with one another thereby produce a removal process that works in accordance with the construction and manufacture of all tire and wheel assemblies.

The unique extension element in conjunction with the grappling structure of the primary preferred embodiment has the advantage of allowing easy insertion of the tool between the tire bead and rim of the wheel assembly.

The unique extension element of the primary preferred embodiment has the further advantage of working on both beads of extra wide tire and wheel assemblies because of it sufficient length, while at the same time working on standard tire and wheel assemblies.

The unique grappling structure of the primary preferred embodiment has the advantage of engaging a substantial portion of the tire bead at one time thereby avoiding excessive stretching or deforming of the tire beads integrity.

The unique grappling structure of the disclosed embodiments have the further advantage of working on the tire's structure in such a way so as to place the working force where it is most efficient for the effective removal of the tire from the wheel assembly, namely upon the tire bead itself and not on areas of the tire sidewall or the tire face tread, which would cause further stretching and deformation of the tire, thus creating an inefficiency of motion.

The unique grappling structure of the disclosed embodiments have the further advantage of being broad enough as to distribute the force associated with the point of contact on the tire bead in such a way that it avoids any tearing or cutting of the tire bead.

The unique grappling structure of the disclosed embodiments have the further advantage of being able to engage a wide variety of tire beads regardless of size and/or shape.

Furthermore the novel angled stay of the first embodiment has the advantage of engaging the wheel at a critical point of contact, namely the edge of the wheel rim, and being positioned as nearly as possible to the tire bead itself, thereby providing the most efficient and effective means of removing the tire from the wheel assembly with a minimum of stretching and/or tearing of the tire bead.

The novel angled stay of the first embodiment has the added advantage of allowing a minimum point of contact allowing for the removal of tires from reverse hub wheel assemblies that have minimum room for clearance of a pivoting movement of the tool.

The unique ram member of the disclosed embodiments have the advantage of retracting so as to work in conjunction with the grappling structure and extension elements thereby allowing for easy insertion and engagement of the tire beads. This is especially true in grappling the second bead of the tire. The nature of its construction eliminates the need for elevating the wheel assembly or blocking the tire so as to reach and grapple the second bead. A single tool can now engage both beads, top and bottom, on an unprecedented variety of tires and wheels. The system is efficient due to the use of a ram working in conjunction with a fixed pushing motion creating a linear and pivoting motion, instead of the prior art methods which use leverage and/or concentric rotation parallel to the wheel and tire axis.

Further, a pivoting motion can be added to the linear motion relieving any unnecessary stretching and/or tearing of the tire bead while removing the tire from the wheel assembly with a minimum of resistance.

The disclosed tools are also easy to use. Due to the design of the tools they are easy to insert between the tire beads and the rim of the wheel assembly. The claimed tools efficiently work on the wheel assembly by placing the working force where it is most efficient for the effective removal of the wheel assembly from the tire, namely upon the rim edge. Further the unique drive assembly creates a push/pull effect using a linear motion for demounting a tire from a wheel assembly.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated herein and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention. In the drawings:

DESCRIPTION OF THE PREFERRED EMBODIMENTS

Figure 1:
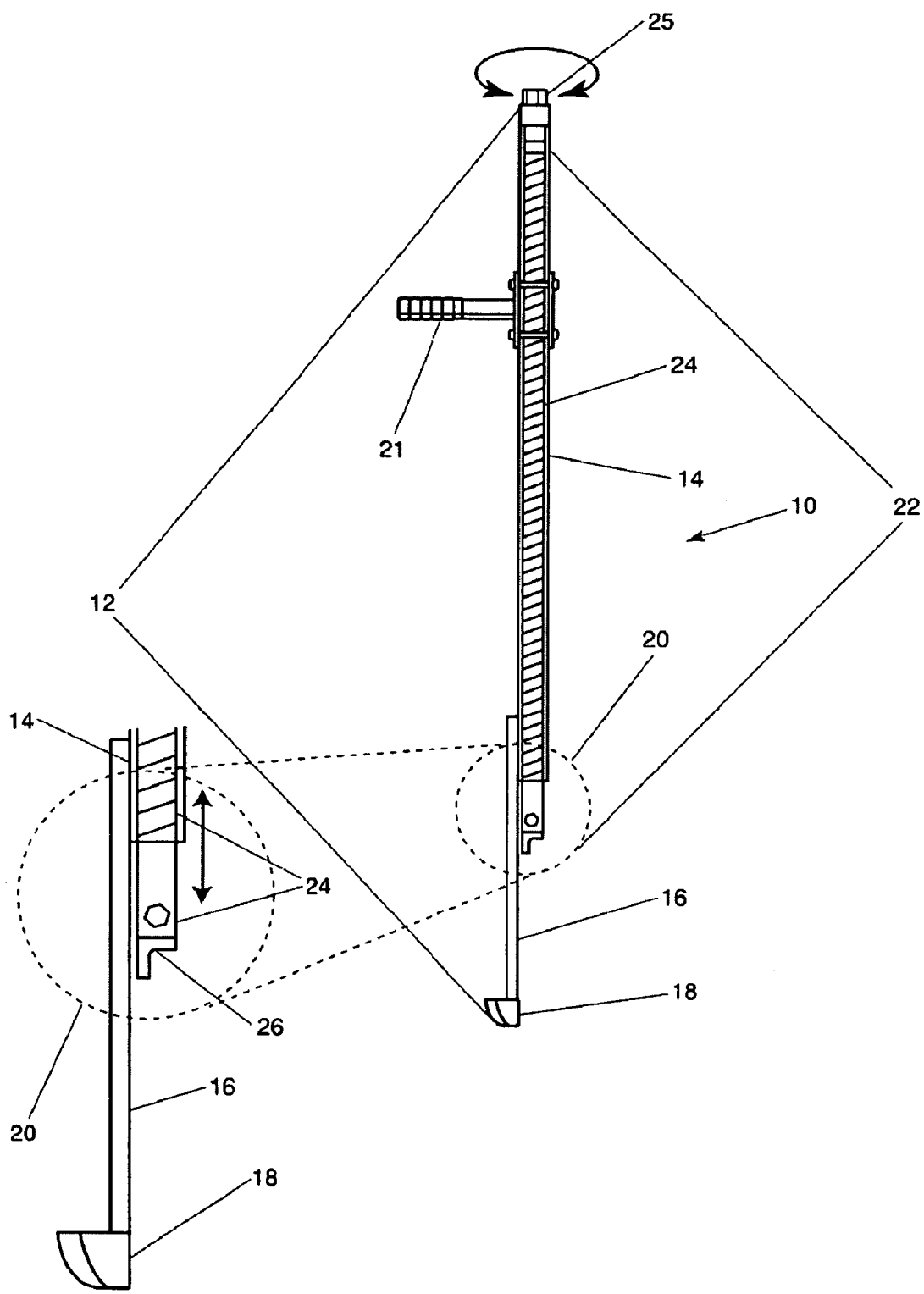
FIG. 1 is a side view of the first embodiment of the hand-held, portable tire demounting machine.
Figure 2:
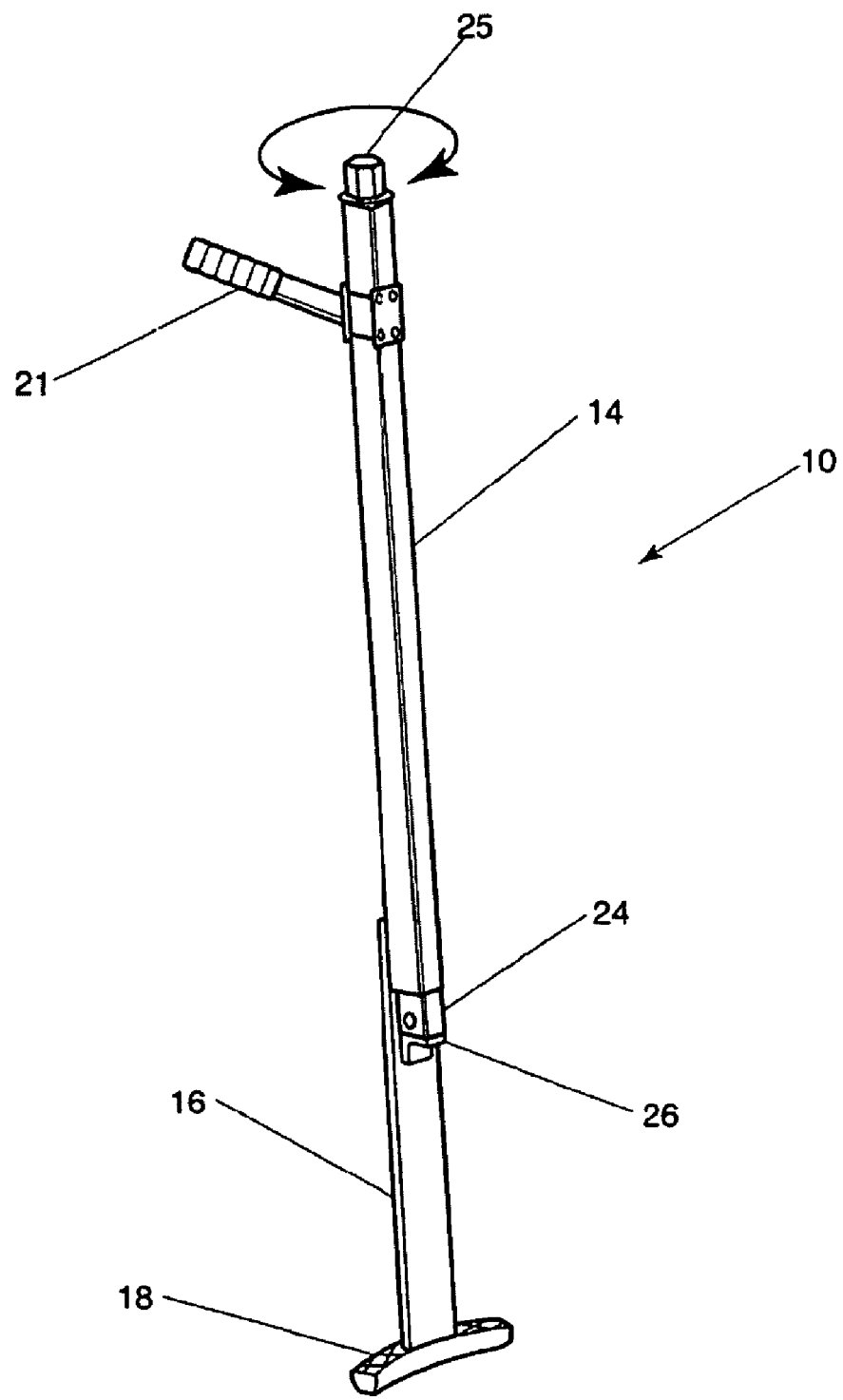
FIG. 2 is a perspective view of the first embodiment of the hand-held, portable tire demounting machine.

Described herein are apparatuses and methods for easily demounting tires from rims or wheel assemblies for most differing sized and configured wheel assemblies while preventing damage to the tires or wheel assemblies. The first embodiment of the presently claimed invention is a unique hand-held portable tire demounting machine along with its related methods of operation. FIG. 1 is a side view of the hand-held, portable tire demounting machine 10 and FIG. 2 is a perspective view of the same embodiment. Referring to FIGS. 1 and 2, the hand-held, portable tire demounting machine 10 has a stationary element 12. Stationary element 12 consists of an elongated tube 14, which is a hollow tube. Affixed to elongated tube 14 is an extension element 16. Affixed to extension element 16 is a grappling structure 18. Grappling structure 18 preferably is configured to have a radius curve running along its width that is approximately the radius of the rim flange of the wheel assembly. The tire bead engagement side of grappling structure 18 is substantially flat and may have a roughened surface such as cross hatched impressions to further grip and engage the bead of the tire. The bottom side preferably has a V-shape or U-shape for easy insertion between the rim flange of the wheel assembly and the tire bead. A drive assembly is inserted and housed inside the top portion of elongated tube 14 along its length. The drive assembly is fully described in co-pending patent applications, U.S. patent application Ser. No. 12/203,296 entitled "Portable Tire Demounting Tool" and U.S. patent application Ser. No. 12/323,254 entitled "Portable Tire Demounting Tool". The disclosures from the co-pending patent applications are incorporated as if fully set forth herein. An exploded view 20 of the driving portion of the tool is provided for convenience. A leveraging handle 21 may also be permanently or removeably attached to the outside of elongated tube 14.

Stationary element 12, and in particular elongated tube 14, further receives a linear motion assembly 22. Linear motion assembly 22 consists of a tubular ram member 24 (see exploded view 20). Attached to distal end of ram member 24 is an angled stay 26. Angled stay 26 is configured to abut against the wheel rim and also to stay in place when demounting machine 10 is pivoted. The drive assembly is engaged by rotating drive bolt 25 causing ram member 24 to linearly protract or retract, depending on which way drive bolt 25 is rotated.

Figure 3:
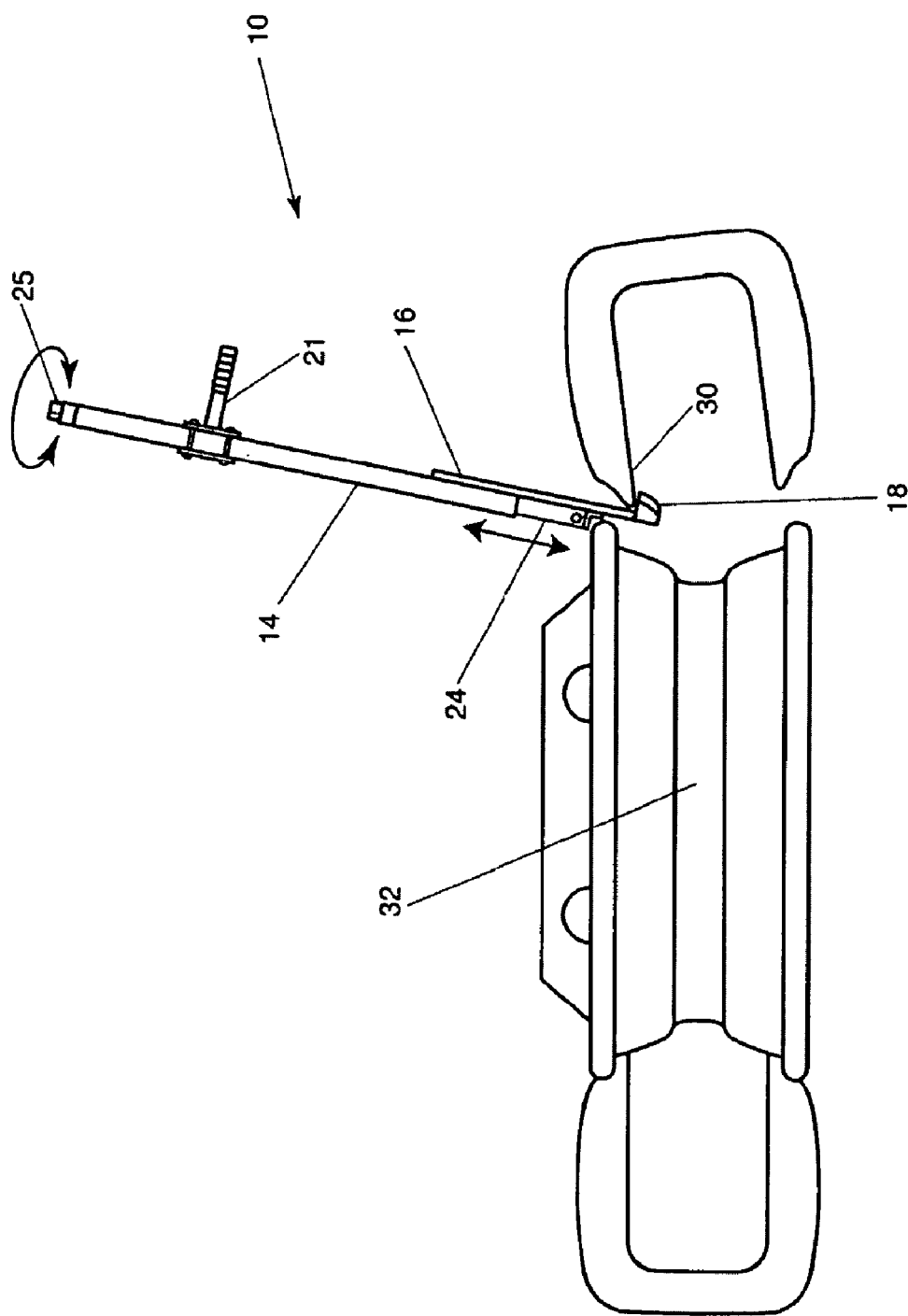
FIG. 3 is a side view of the first embodiment of the hand-held, portable tire demounting machine illustrating the insertion of the grappling structure between the tire bead and wheel assembly.

FIG. 3 is a side view of the first embodiment of the hand-held, portable tire demounting machine 10, illustrating the insertion of extension element 16 and grappling structure 18 between first tire bead 30 and wheel assembly 32. Tubular ram member 24 is substantially retracted up into elongated tube 14 via rotation of drive bolt 25, which activates the drive assembly to provide sufficient clearance for insertion of extension element 16 and grappling structure 18 between tire bead 30 and wheel assembly 32. Handle 21 further facilitates the insertion.

Figure 4:
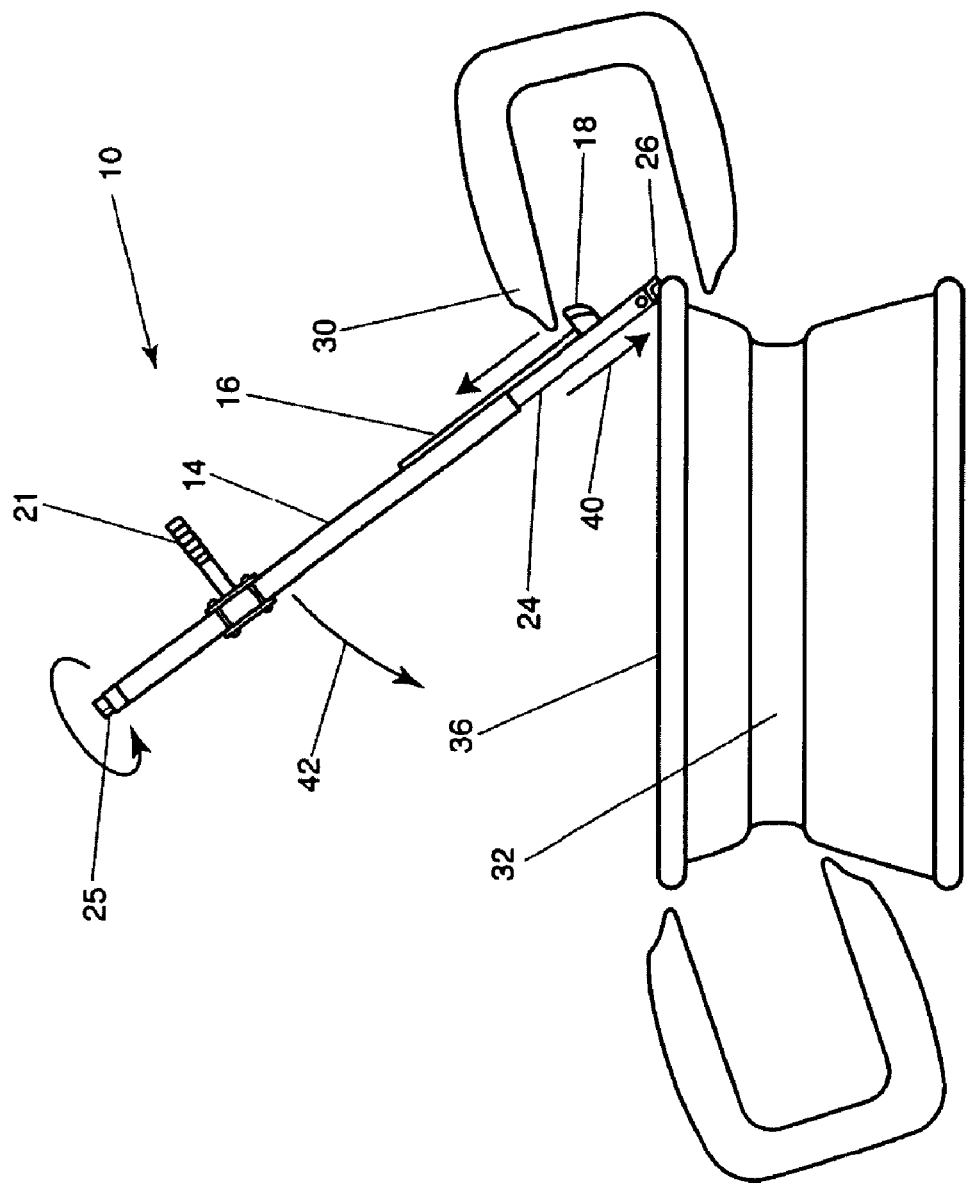
FIG. 4 is a side cut away view of the first embodiment of the hand-held, portable tire demounting machine in the process of the removal of the first tire bead.

FIG. 4 is a side view of the first embodiment of the hand-held, portable tire demounting machine 10 in the process of the removal of first tire bead 30. After insertion of extension element 16 and grappling structure 18 between first tire bead 30, and wheel assembly 32, as seen in FIG. 3, ram member 24 is substantially rammed forward or elongating demounting machine 10 via drive bolt 25, which activates the drive assembly until angled stay 26 sufficiently engages top rim 36 of wheel assembly 32. Simultaneously, a corresponding and opposite motion occurs for extension element 16, and grappling structure 18 begins a retraction motion. Grappling structure 18 engages the interior of the first tire bead 38 effectively peeling first tire bead 30 away from wheel assembly 32 by creating linear motion 40 and a pivoting motion 42. This occurs in conjunction with manipulation via leveraging handle 21.

Figure 5:
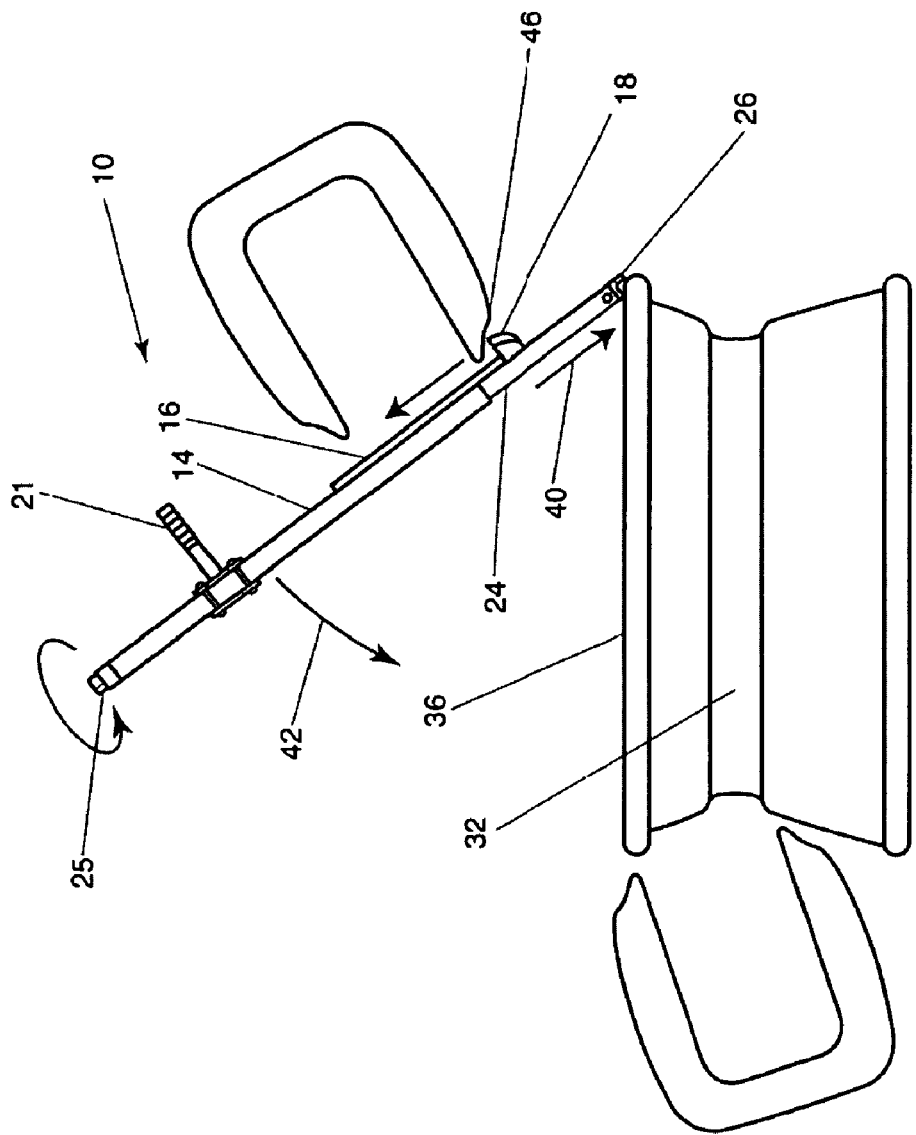
FIG. 5 is a side cut away view of the first embodiment of the hand-held, portable tire demounting machine in the process of the removal of the second tire bead.

FIG. 5 is a side view of the first embodiment of the hand-held, portable tire demounting machine 10 in the process of the removal of second tire bead 46. As in FIG. 3, tubular ram member 24 is substantially retracted into elongated tube 14 via drive bolt 25 that activates the drive assembly to provide sufficient clearance for insertion of extension element 16 and grappling structure 18 between second tire bead 46 and wheel assembly 32. Tubular ram member 24 is substantially rammed forward, causing demounting machine to protract, via the drive assembly until angled stay 26 sufficiently engages top rim 36 of wheel assembly 32. Simultaneously a corresponding and opposite motion occurs for extension element 16 and grappling structure 18 by providing a retraction motion. Grappling structure 18 engages the exterior of second tire bead 46 effectively peeling second tire bead 46 away from wheel assembly 32 by creating linear motion 40 and a pivoting motion 42.

Figure 6:
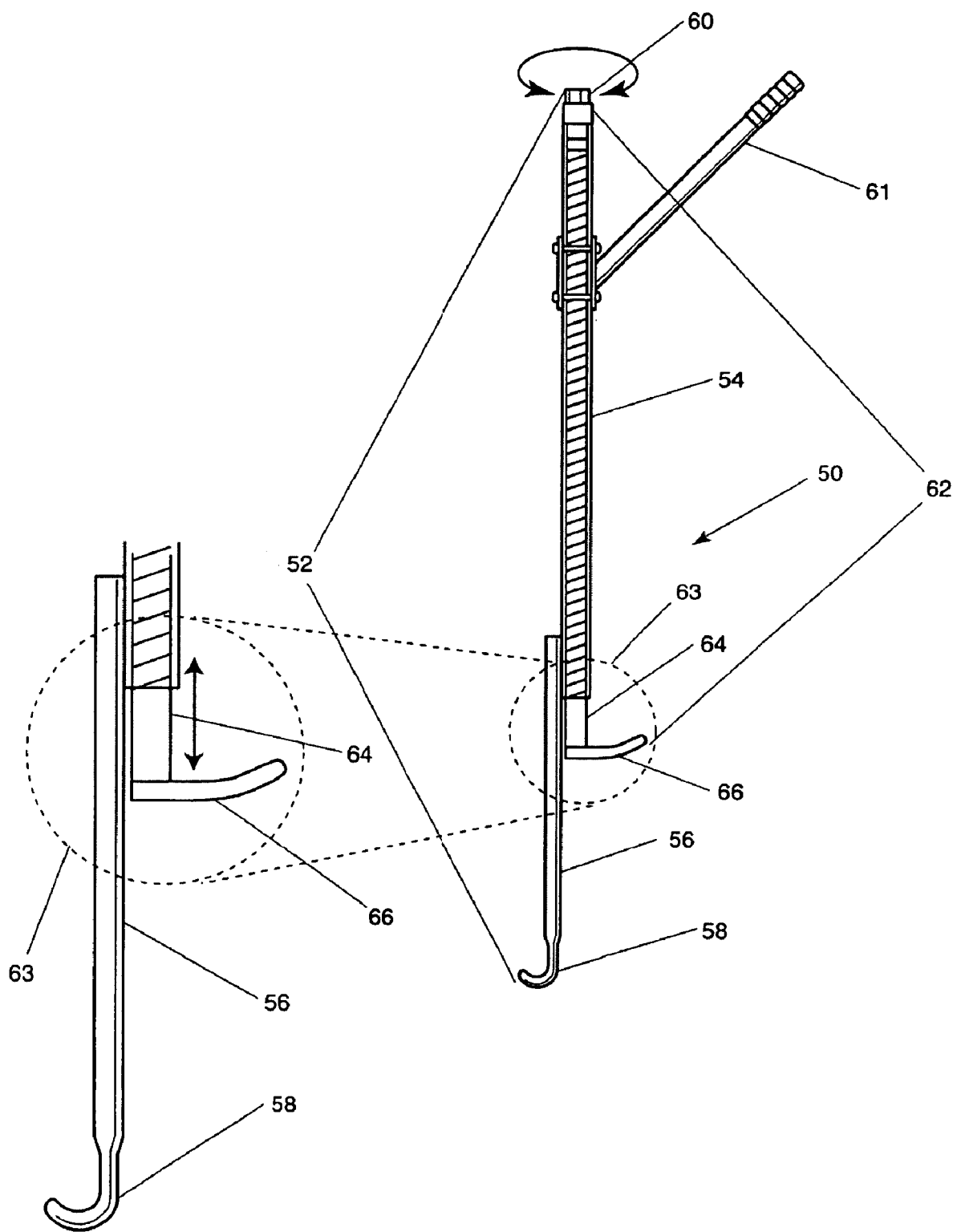
FIG. 6 is a side view of the second embodiment of the hand-held, portable tire demounting machine.
Figure 7:
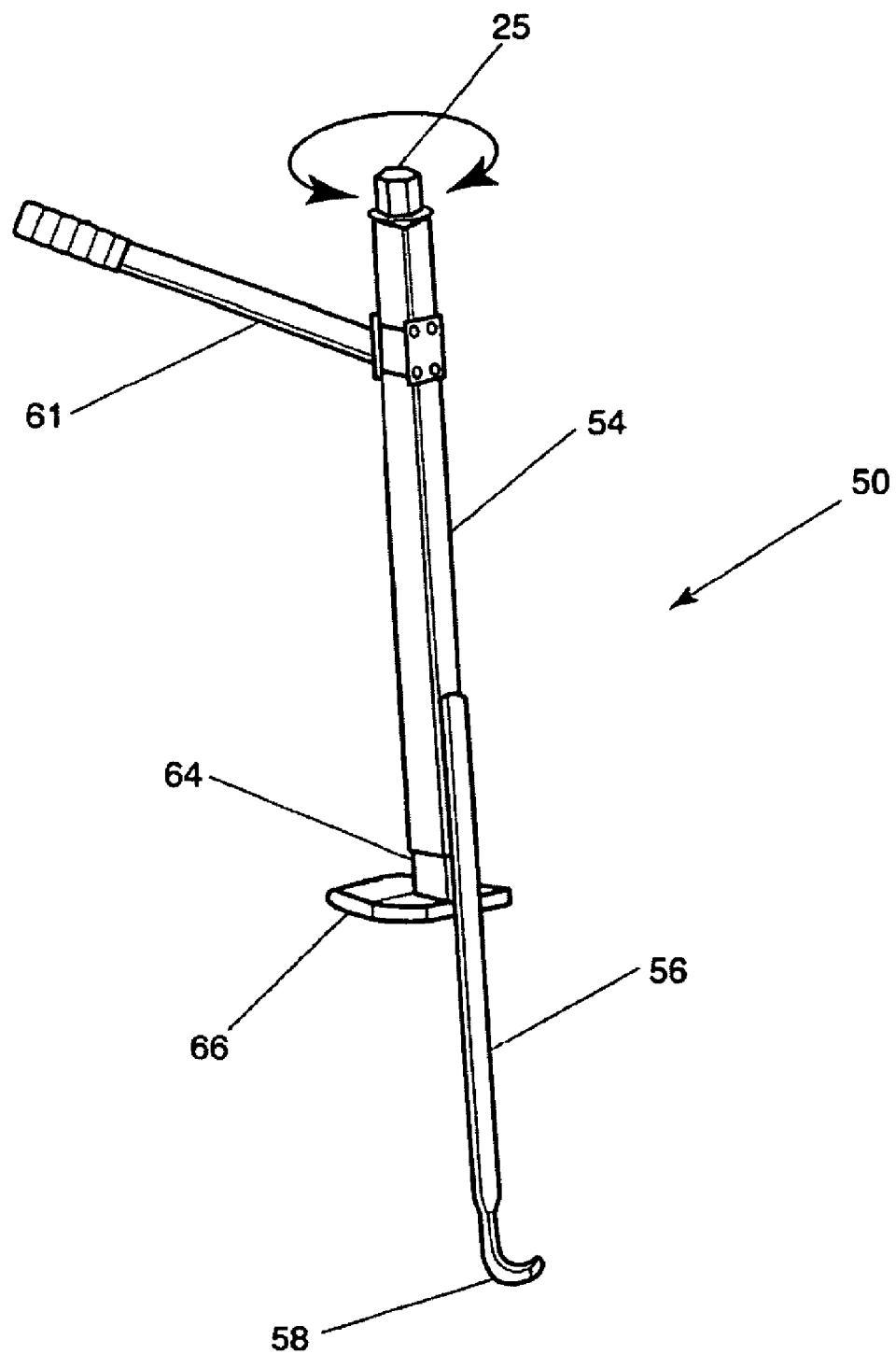
FIG. 7 is a side view of the second embodiment of the hand-held, portable tire demounting machine.

The second embodiment of the unique hand-held, portable tire demounting machine 50 is an apparatus and method for pulling the rim from a second bead of a tire. FIG. 6 is a side view of the hand-held, portable tire demounting machine 50 and FIG. 7 is a perspective view of the embodiment of FIG. 6. Referring to FIGS. 6 and 7, hand-held, portable tire demounting machine 50 has a stationary element 52. Stationary element 52 consists of an elongated tube 54 and an extension element 56 affixed to elongated tube 54. Affixed to extension element 56 is a hook 58. Hook 58 is configured to accept or hook the bottom rim flange of a wheel assembly. A drive assembly is inserted and housed inside the top portion of the elongated tube 54 along its length. The drive assembly comprises components to convert a rotational movement into a linear movement. The drive assembly is fully described in co-pending patent applications, U.S. patent application Ser. No. 12/203,296 entitled "Portable Tire Demounting Tool" and U.S. patent application Ser. No. 12/323,254 entitled "Portable Tire Demounting Tool". The disclosures from the co-pending patent applications are incorporated as if fully set forth herein. The drive assembly is driven by a drive bolt 60. Ram member 64 is raised and lowered telescopically by the rotational movement of drive bolt 60. A leveraging handle 61 may also be permanently or removably attached to the outside of elongated tube 54.

Stationary element 52 and in particular the elongated tube 54 further receives a linear motion assembly 62. The linear motion assembly 62 consists of a tubular ram member 64. Projected view 63 shows the linear movement of ram member 64 in relation to stationary element 52. Attached to the distal end of ram member 64 is a push plate 66 for engaging or pushing a tire sidewall and bead.

Figure 8:
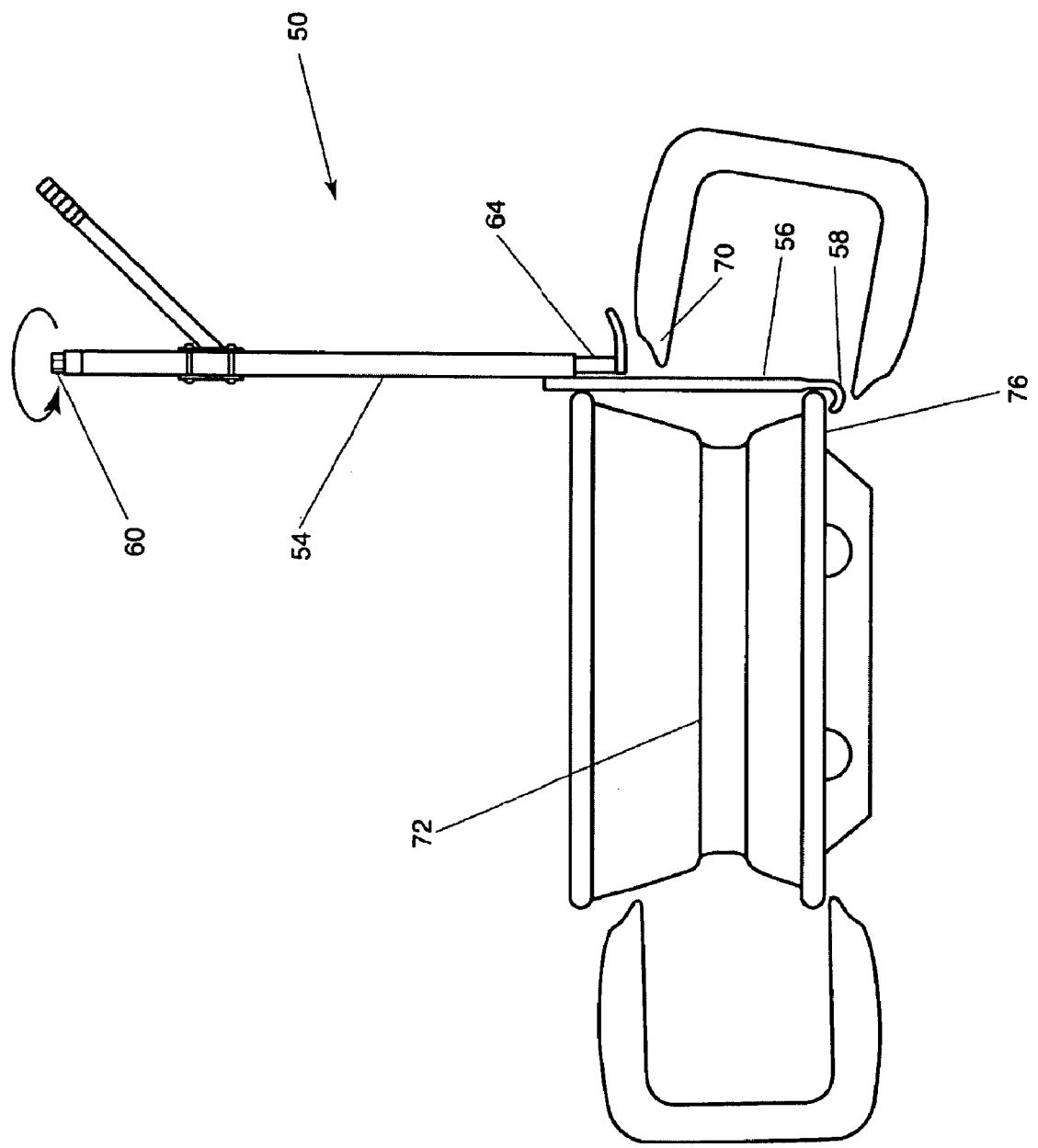
FIG. 8 is a side view of the second embodiment of the hand-held, portable tire demounting machine illustrating the insertion of the hook between the second tire bead and wheel assembly.

FIG. 8 is a side view of the second embodiment of the hand-held, portable tire demounting machine 50 illustrating the insertion of extension element 56 and hook 58 between second tire bead 70 and wheel assembly 72. This operation is performed after the first tire bead is removed. Tubular ram member 64 is substantially retracted up into the elongated tube 54 via the drive assembly by rotation of drive bolt 60 to provide sufficient clearance for extension element 56 and hook 58 for easy insertion between second tire bead 70 and wheel assembly 72. Hook 58 can be turned ninety degrees (90°) to prevent hook 58 from catching on any surface and for easy insertion. After insertion, hook 58 is extended far enough to engage rim edge 76 of the wheel assembly, as shown.

Figure 9:
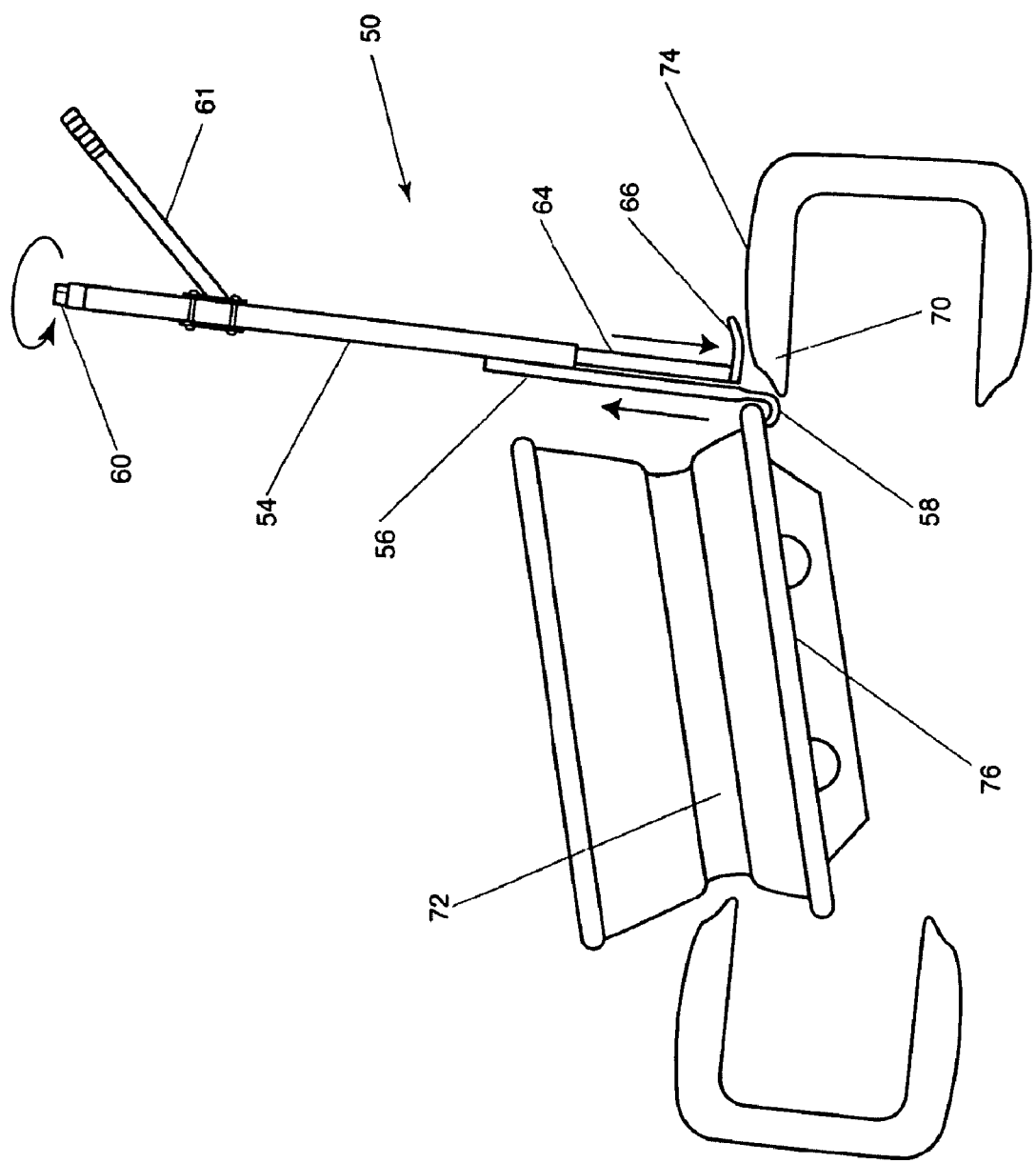
FIG. 9 is a side cut away view of the second embodiment of the hand-held, portable tire demounting machine in the process of the removal of the second tire bead.

FIG. 9 is a side view of the second embodiment of the hand-held, portable tire demounting machine 50 in the process of the removal of wheel assembly 72 from second tire bead 70. Hook 58 engages or hooks rim 76 of wheel assembly 72 and push plate 66 is pressed up to tire side wall 74 as shown. Tubular ram member 64 is rammed forward via the drive assembly by rotation of drive bolt 60 until tire side wall and push plate 66 engage tire side wall 74 near second tire bead 70. Simultaneously, a corresponding and opposite motion occurs for extension element 56 and hook 58 with a retraction motion. Hook 58 engages the lower edge of rim 76 of wheel assembly 72 effectively peeling wheel assembly 72 away from second tire bead 70. This creates a linear motion 78. A corresponding pivoting/leverage motion 80 may be used via leveraging handle 61 to finally pry wheel assembly 72 from tire second bead 70.

Although the presently claimed invention has been described in detail with particular reference to these preferred embodiments, other embodiments can achieve the same results. Variations and modifications of the presently claimed invention will be obvious to those skilled in the art and it is intended to cover all such modifications and equivalents. The entire disclosures of all references, applications, patents, and publications cited above, are hereby incorporated by reference.

What is claimed is:

1. A method for removing a tire from a wheel assembly, the method comprising the steps of:
    a) inserting a grappling member between a bead of the tire and a rim of the wheel assembly, the grappling member affixed to a stationary member;
    b) gripping the bead of the tire with the grappling member;
    c) engaging an angled stop of a moveable ram member with the rim, the ram member disposed on the stationary member; and
    d) protracting the ram member telescopically from the grappling member to pull the bead over the rim.

2. The method of claim 1 further comprising the step of pushing the stationary member in a downward motion via a pivot point at the angled stop.

3. The method of claim 1 wherein the step of protracting comprises actuating a drive mechanism.

4. The method of claim 1 further comprising the step of performing steps a) through d) on a first bead and performing steps a) through d) on a second bead of the tire.

5. The method of claim 1 wherein the step of inserting further comprises retracting the ram member to a predetermined distance to provide sufficient clearance for inserting the grappling member.

6. The method of claim 1 wherein the step of gripping comprises inserting a roughened face of the grappling member to an edge of an underside of the bead.

7. A method for removing a second bead of a tire from a wheel assembly, the method comprising the steps of:
    a) inserting a hook between the second bead of the tire and a rim of the wheel assembly, the hook affixed to a stationary member;
    b) hooking a rim edge of the rim with the hook;
    c) engaging an end of a moveable ram member with a sidewall of the tire, the ram member disposed on the stationary member; and
    d) protracting the ram member telescopically from the hook to pull the rim away from the second bead.

8. The method of claim 7 further comprising the step of pushing the stationary member in a downward motion via a pivot point comprising a curved heel member of a push plate.

9. The method of claim 7 wherein the step of protracting comprises actuating a drive mechanism.

10. The method of claim 7 wherein the step of inserting further comprises retracting the ram member to a predetermined distance to provide sufficient clearance to insert the hook without interference.

* * * * *